UNITED STATES PATENT OFFICE.

JAMES HOWARD, OF PHILADELPHIA, PENNSYLVANIA.

COMPOSITION FOR PRESERVING FOOD.

SPECIFICATION forming part of Letters Patent No. 276,246, dated April 24, 1883.

Application filed February 14, 1883. (No specimens.)

*To all whom it may concern:*

Be it known that I, JAMES HOWARD, of Philadelphia, Pennsylvania, have invented a new and Improved Compound for Preserving Animal and Vegetable Substances, whereof the following is a specification.

The antiseptic properties of boracic acid are well known, and various attempts have been made to utilize them on a practically commercial scale for the preservation of meat, &c. Owing to the difficulty of dissolving the acid in water or other practically available solvent for application, and also to its volatility in such solutions, or under the influence of heat, it has generally been found necessary to use it in the form of a chemical combination with other substances. So far as I am aware, however, in the production of these compounds the acid has always been employed in the form of a solution, and the resultant compound has been evaporated to dryness, and in some instances heat has been used to aid the reaction of forming the compound. Thus in all of these processes, when conducted on a commercial scale, the difficulty of solution and the loss through volatilization of the acid have remained. Moreover, such salts or combinations of boracic acid as have been obtained and used for the purpose—viz., chiefly the borate and biborate of soda, either alone or in a state of admixture with other substances—impart to the articles to be preserved a peculiar and characteristic taste, which in food is undesirable. If the acid is used in a state of mechanical admixture merely with other substances, it still is not fully available, since, owing to its slippery or unctuous nature, it is almost impossible to reduce the crystals to powder. Hence, if the mixture is used dry, the acid is not distributed throughout, but remains in small separate crystals, and if it is attempted to employ it in the form of a solution, the other substances will dissolve, leaving the acid crystals practically intact.

I have discovered a method of obtaining a chemical compound of boracic acid, for the production of which neither solution nor the employment of heat is necessary, the salt being formed by the union of the component substances in a dry state, so that the difficulties of solution and of loss through volatilization are avoided. Moreover, the compound has antiseptic properties distinct from those of the acid itself, due to one of the other elements thereof, and is tasteless. I take preferably not less than five parts, by weight, of pure boracic acid in the form of crystals and add thereto one part of pure phosphate of soda. The ingredients are mixed together dry in a mill or other suitable grinding apparatus, and as the chemical reaction between them progresses the whole, or practically the whole, of the acid crystals lose their structure, and the mass can be ground until it assumes a pasty or doughy condition. The result is a boro-phosphate of soda, containing more or less free boracic acid, according to the excess thereof used above the proportions given. The moisture yielded by the chemical reaction is evaporated at the ordinary temperature by exposure to the air without loss of boracic acid, and the dry amorphous salt thus produced is readily ground. It may be used either as a dry powder or may be dissolved in water and applied in the usual modes to the substances to be preserved.

If desired, other substances—such as, for instance, salt and saltpeter—may be added to the boro-phosphate compound, and the whole mixed thoroughly by regrinding. I do not, however, desire to limit my claim to the use of the boro-phosphate in such combinations, and therefore only mention them as adjuncts which may be found useful.

I am aware that it has heretofore been proposed to combine boracic acid with biborate of soda in solution and evaporate to dryness, so as to form a compound containing free boracic acid, and I therefore do not claim such compounds, as they in no way resemble the double salt produced, as hereinbefore described by my invention.

What I claim, and desire to secure by Letters Patent, is—

The hereinbefore-described preserving compound, consisting of boro-phosphate of soda and free boracic acid combined, substantially in the manner and proportions set forth.

JAMES HOWARD

Witnesses:
J. W. DOUGLASS,
S. H. POOLE.